(12) United States Patent
Ishino et al.

(10) Patent No.: US 9,148,492 B2
(45) Date of Patent: Sep. 29, 2015

(54) RELAY DEVICE, RELAY METHOD, AND NON-TRANSITORY COMPUTER READABLE MEDIUM

(71) Applicant: FUJI XEROX CO., LTD., Minato-ku, Tokyo (JP)

(72) Inventors: Shigeki Ishino, Kanagawa (JP); Junya Kato, Kanagawa (JP); Ryoji Matsumura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/780,451

(22) Filed: Feb. 28, 2013

(65) Prior Publication Data

US 2014/0002836 A1    Jan. 2, 2014

(30) Foreign Application Priority Data

Jul. 2, 2012  (JP) .................................. 2012-148757

(51) Int. Cl.
*H04L 29/06* (2006.01)
*G06F 3/12* (2006.01)

(52) U.S. Cl.
CPC .............. *H04L 67/42* (2013.01); *G06F 3/1206* (2013.01); *G06F 3/1247* (2013.01); *G06F 3/1271* (2013.01); *G06F 3/1288* (2013.01); *G06F 3/1298* (2013.01)

(58) Field of Classification Search
CPC ............ H04L 29/08144; G06F 3/1298; G06F 3/1297
See application file for complete search history.

(56) References Cited

U.S. PATENT DOCUMENTS

| | | | |
|---|---|---|---|
| 2011/0286026 A1* | 11/2011 | Matsuzawa | 358/1.14 |
| 2012/0086978 A1 | 4/2012 | Uchikawa | |
| 2012/0117629 A1* | 5/2012 | Miyazawa et al. | 726/4 |
| 2012/0188575 A1* | 7/2012 | Young et al. | 358/1.13 |
| 2012/0218599 A1* | 8/2012 | Kashioka | 358/1.15 |
| 2013/0003106 A1* | 1/2013 | Nishida et al. | 358/1.14 |
| 2013/0021647 A1* | 1/2013 | Ozaki | 358/1.15 |
| 2013/0120794 A1* | 5/2013 | Kamoi | 358/1.15 |
| 2013/0163017 A1* | 6/2013 | Matsuda | 358/1.13 |
| 2013/0163027 A1* | 6/2013 | Shustef | 358/1.14 |
| 2013/0163038 A1* | 6/2013 | Oishi | 358/1.15 |

FOREIGN PATENT DOCUMENTS

JP     2012-083845 A     4/2012

* cited by examiner

*Primary Examiner* — Hilina K Demeter
(74) *Attorney, Agent, or Firm* — Sughrue Mion, PLLC

(57) ABSTRACT

A relay device includes a communication unit, a first conversion unit, a second conversion unit, and a controller. The communication unit communicates with a client device and a service providing device. The first conversion unit performs a first conversion process for performing conversion between a language interpretable by each client device and a language interpretable by the relay device. The second conversion unit performs a second conversion process for performing conversion between a language interpretable by each service providing device and the language interpretable by the relay device. The controller performs control so that data sent from the client device is subjected to the first conversion process and then the second conversion process before transmitted to the service providing device and data sent from the service providing device is subjected to the second conversion process and then the first conversion process before transmitted to the client device.

4 Claims, 7 Drawing Sheets

FIG. 6

| USER NAME | PASSWORD |
|---|---|
| tanaka-cloud | aaaa |
| yamada-cloud | bbbb |
| ... | ... |
| ... | ... |

FIG. 7

| USER ID | ACCESS TOKEN |
|---|---|
| tanaka | 1234abcd |
| yamada | 5w6x7y8z |
| ... | ... |
| ... | ... |

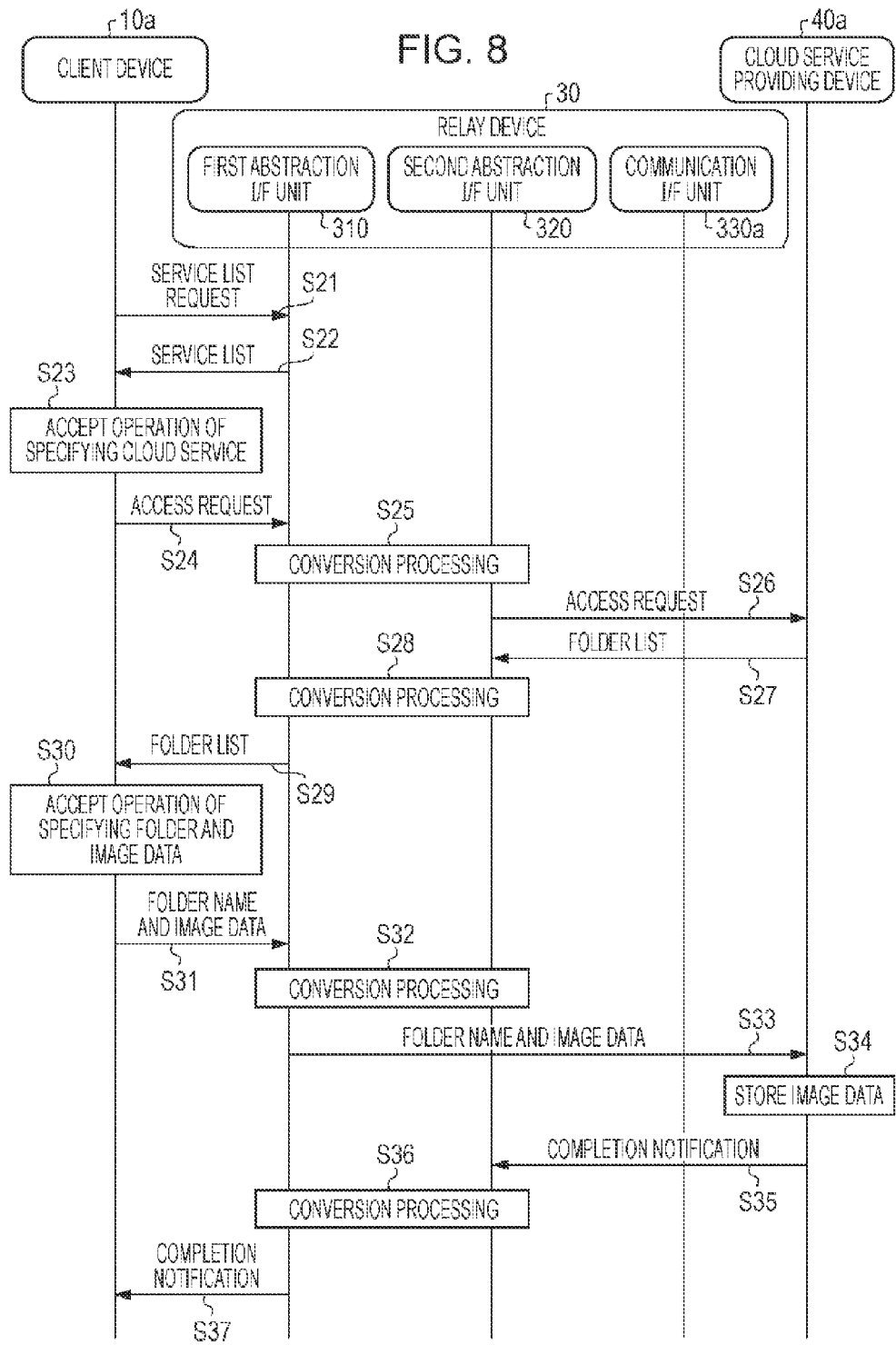

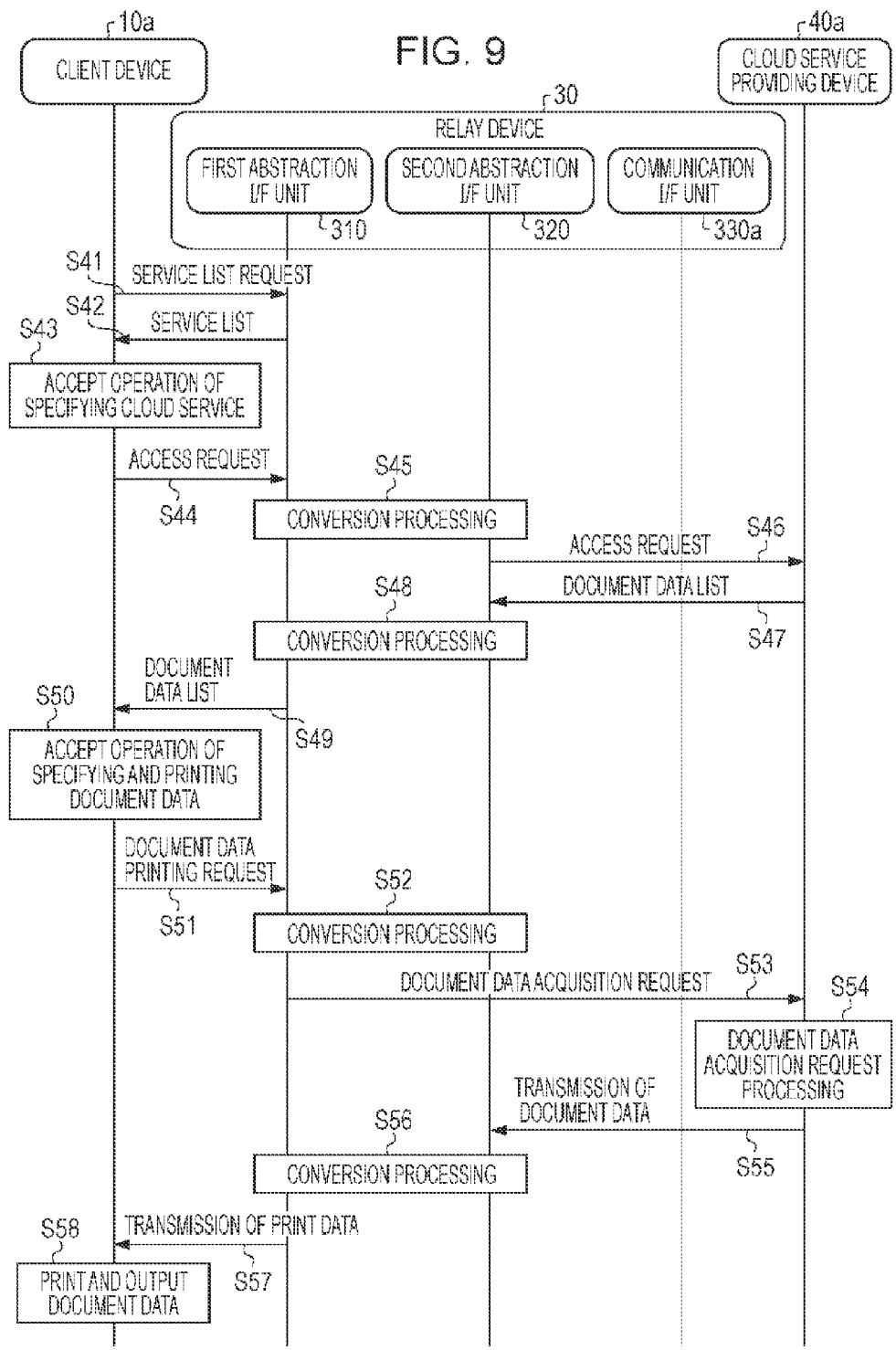

RELAY DEVICE, RELAY METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-148757 filed Jul. 2, 2012.

BACKGROUND (i) Technical Field

The present invention relates to a relay device, a relay method, and a non-transitory computer readable medium.

(ii) Related Art

Services in which server devices on networks in place of client devices perform various kinds of information processing, such as storing data and converting a data format, are called cloud services or cloud computing services.

SUMMARY

According to an aspect of the invention, there is provided a relay device including a communication unit, a first conversion unit, a second conversion unit, and a controller. The communication unit communicates with a client device and a service providing device that provides a service to the client device. The first conversion unit performs a first conversion process for performing conversion between a language interpretable by each of plural client devices and a language interpretable by the relay device. The second conversion unit performs a second conversion process for performing conversion between a language interpretable by each of plural service providing devices and the language interpretable by the relay device. The controller performs control so that when the communication unit receives data sent to the service providing device from the client device, the first conversion unit performs the first conversion process on the data, the second conversion unit then performs the second conversion process on the data, and the communication unit transmits data obtained after the first conversion process and the second conversion process have been performed to the service providing device; and so that when the communication unit receives data sent to the client device from the service providing device, the second conversion unit performs the second conversion process on the data, the first conversion unit then performs the first conversion process on the data, and the communication unit transmits data obtained after the second conversion process and the first conversion process have been performed to the client device.

BRIEF DESCRIPTION OF THE DRAWINGS

An exemplary embodiment of the present invention will be described in detail based on the following figures, wherein:

FIG. 6 illustrates an example of a user database stored in a cloud service providing device;

FIG. 7 illustrates an example of data stored in the relay device;

FIG. 8 is a sequence diagram illustrating the operation of the communication system; and FIG. 9 is a sequence diagram illustrating the operation of the communication system.

DETAILED DESCRIPTION

Figure 1:
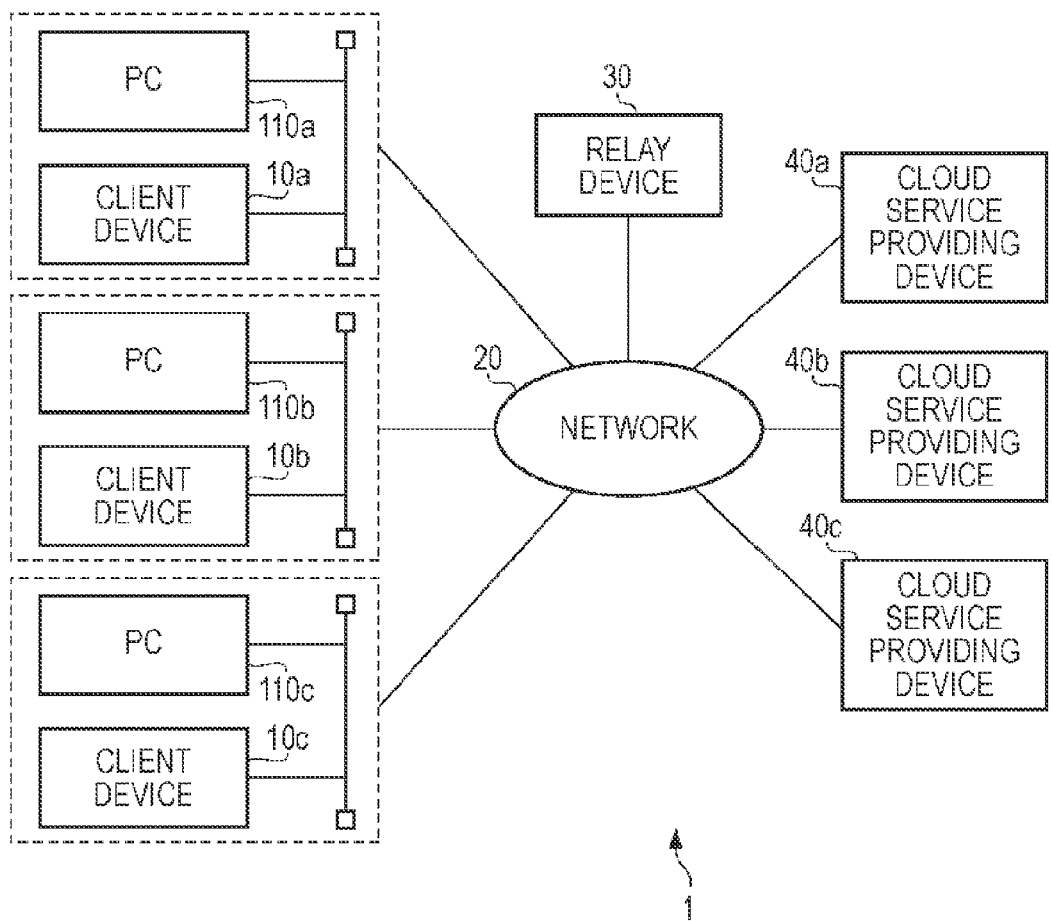
FIG. 1 is a block diagram illustrating the configuration of a communication system.

FIG. 1 is a block diagram illustrating the overall configuration of a communication system 1 according to an exemplary embodiment of the present invention. The communication system 1 includes plural client devices 10a, 10b, and 10c, plural personal computers (PCs) 100a, 100b, and 100c, a network 20, a relay device 30, and plural cloud service providing devices 40a, 40b, and 40c. The client device 10a and the PC 100a may be used in pair, the client device 10b and the PC 100b may be used in pair, and the client device 10c and the PC 100c may be used in pair. Each of the pairs may be accommodated in an individual network such as a local area network (LAN).

Each of the cloud service providing devices 40a, 40b, and 40c is a device that provides so-called cloud services, and is an example of a service providing device according to an exemplary embodiment of the present invention. The term "cloud service", as used herein, refers to a service in which a server device on a network, rather than a client device, performs various kinds of information processing, such as storing data, providing data, and converting a data format. The client devices 10a, 10b, and 10c are information processing devices that receive cloud services provided from the cloud service providing devices 40a, 40b, and 40c. In this exemplary embodiment, the client devices 10a, 10b, and 10c may be image forming devices such as printers, image reading devices such as scanners, or the like. The network 20 is a communication network via which the client devices 10a, 10b, and 10c, the PCs 100a, 100b, and 100c, the relay device 30, and the cloud service providing devices 40a, 40b, and 40c are connected to one another, and may be, for example, the Internet.

When cloud services are provided from the cloud service providing devices 40a, 40b, and 40c to the client devices 10a, 10b, and 10c, the relay device 30 relays data exchanged between the cloud service providing devices 40a, 40b, and 40c and the client devices 10a, 10b, and 10c. More specifically, for example, when image data to be stored is transmitted from any of the client devices 10a, 10b, and 10c, the relay device 30 transfers the image data to any of the cloud service providing devices 40a, 40b, and 40c or, when image data to be output is transmitted from any of the cloud service providing devices 40a, 40b, and 40c, the relay device 30 transfers the image data to any of the client devices 10a, 10b, and 10c. Alternatively, while the image data described above is transmitted and received between the cloud service providing devices 40a, 40b, and 40c and the client devices 10a, 10b, and 10c, the relay device 30 calls a service other than the service for transmitting and receiving the image data described above (such as a service for performing image recognition called optical character recognition (OCR) or a service for converting the format of the image data).

The client devices 10a, 10b, and 10c have various resources implemented thereon. For example, some image forming devices serving as client devices may have lower display capabilities than general PCs, and even client devices included in the same category of image forming device may have different processing capabilities and different types of formats of image data to support. Because of different developers or administrators, the cloud service providing devices 40a, 40b, and 40c have various specifications such as different interpretable commands, communication protocols, and languages used to exchange data between devices, such as application programming interfaces (APIs). For this reason, the relay device 30 is configured to relay data such as control data, image data, and files exchanged between the client devices 10a, 10b, and 10c and the cloud service providing devices 40a, 40b, and 40c without being affected by the difference in resource of the client devices 10a, 10b, and 10c or the difference in specification of the cloud service providing devices 40a, 40b, and 40c.

Single sign-on is available as a mechanism for authentication processing in the relay of data of this type. Single sign-on is a process in which a relay device or the like holds plural pieces of authentication information registered in the individual cloud services, namely, user names and passwords, in association with each other and the relay device is responsible for logging in the individual cloud services. In this mechanism, however, since the relay device 30 holds authentication information, namely, personal information such as user names and passwords, the risk of such personal information leaking to any third party may not be undeniable. Accordingly, the relay device 30 is configured to relay data from the client devices 10a, 10b, and 10c to the cloud service providing devices 40a, 40b, and 40c without holding user names and passwords registered by the users in the cloud service providing devices 40a, 40b, and 40c.

The number of devices constituting the communication system 1 is not limited to that illustrated in FIG. 1. The hardware configurations and operations of the client devices 10a, 10b, and 10c are substantially equivalent, and therefore the client devices 10a, 10b, and 10c will be hereinafter collectively referred to as the "client devices 10" or each individually as the "client device 10" unless individually identified. The PCs 100a, 100b, and 100c and the cloud service providing devices 40a, 40b, and 40c will also sometimes be collectively referred to as the "PCs 100" and the "cloud service providing devices 40" or each individually as the "PC 100" and the "cloud service providing device 40", respectively.

Figure 2:
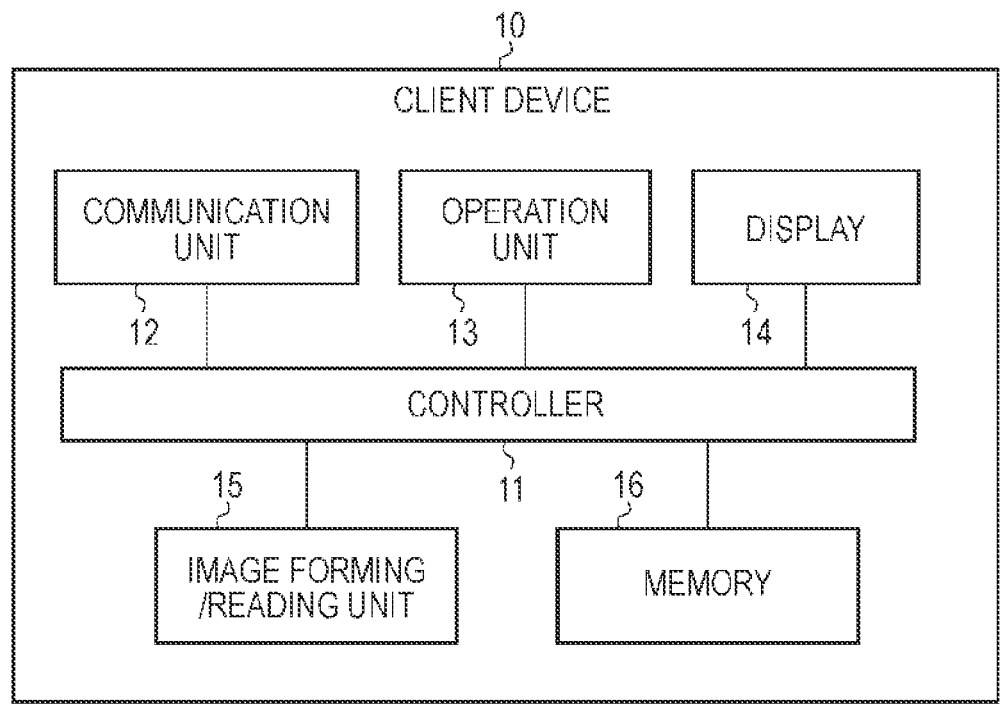
FIG. 2 is a block diagram illustrating the hardware configuration of a client device.

FIG. 2 illustrates the hardware configuration of each of the client devices 10. The client device 10 includes a controller 11, a communication unit 12, an operation unit 13, a display 14, an image forming/reading unit 15, and a memory 16. The controller 11 includes an arithmetic unit such as a central processing unit (CPU) and main memory devices such as a read only memory (ROM) and a random access memory (RAM). The ROM stores a program to be executed by the CPU. The CPU uses the RAM as a work area and executes a program stored in the ROM or the memory 16 to control the operation of the individual units of the client device 10. The communication unit 12 communicates with the relay device 30 and the cloud service providing devices 40 via the network 20 in accordance with, for example, the Hypertext Transfer Protocol (HTTP). The communication unit 12 is an example of a communication unit according to an exemplary embodiment of the present invention. The operation unit 13 may be an operation unit having operators such as various keys and a touch sensor, and supplies an operation signal corresponding to an operation of the user to the controller 11. The controller 11 performs processing in accordance with the operation signal. The display 14 may be a display having a liquid crystal panel and a liquid crystal drive circuit, and is configured to display an image under control of the controller 11. The image forming/reading unit 15 is configured to form an electrophotographic image and to optically read an image on a document. The memory 16 may be a large-capacity memory such as a hard disk, and stores a data group or program group to be used by the controller 11.

Figure 3:
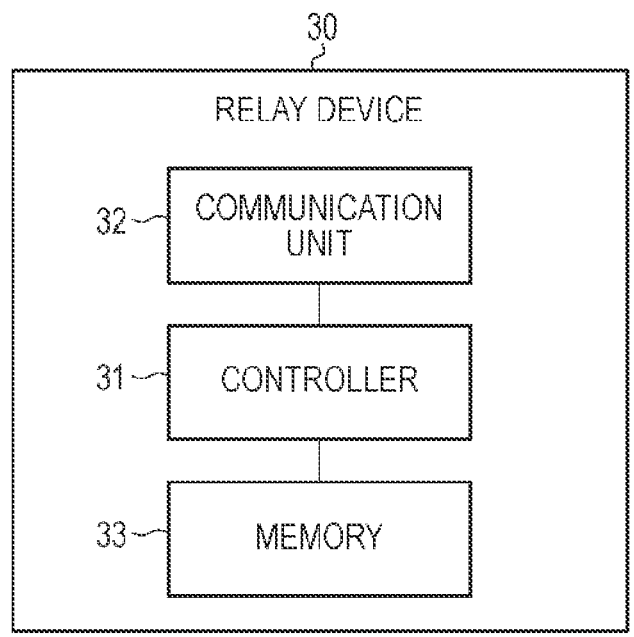
FIG. 3 is a block diagram illustrating the hardware configuration of a relay device.

FIG. 3 illustrates the hardware configuration of the relay device 30. The relay device 30 is configured as a computer including a controller 31, a communication unit 32, and a memory 33. The controller 31 includes an arithmetic unit such as a CPU and main memory devices such as a ROM and a RAM. The CPU uses the RAM as a work area and executes a program stored in the ROM or the memory 33 to control the operation of the individual units of the relay device 30. The communication unit 32 performs data communication with the client devices 10, the PCs 100, and the cloud service providing devices 40 via the network 20 in accordance with, for example, the HTTP. The memory 33 may be a non-volatile large-capacity memory such as a hard disk, and stores a data group or program group to be used by the controller 31.

Figure 4:
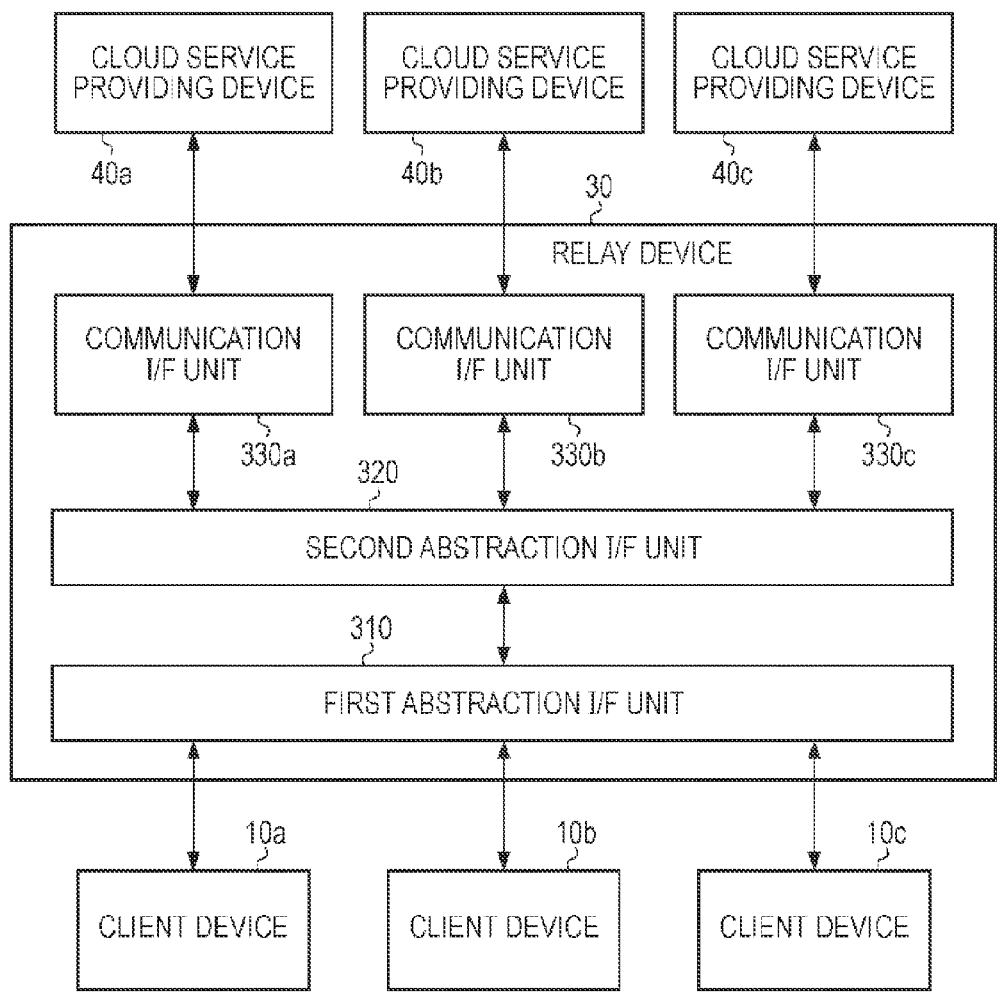
FIG. 4 is a block diagram illustrating the software configuration of the relay device.

FIG. 4 illustrates the functional configuration of the relay device 30. The relay device 30 includes a first abstraction interface unit 310 (an interface will be hereinafter referred to as an "I/F"), a second abstraction I/F unit 320, and communication I/F units 330a, 330b, and 330c. The first abstraction I/F unit 310 is configured to absorb a difference between the client devices 10, and implements mutual conversion between a language interpretable by each of the client devices 10, such as a control command and an API, and an intermediate language interpretable by the relay device 30. The second abstraction I/F unit 320 is configured to absorb a difference between the cloud service providing devices 40, and implements mutual conversion between a language interpretable by each of the cloud service providing devices 40, such as a control command and an API, and the intermediate language interpretable by the relay device 30. The number of communication I/F units 330 is equal to the number of cloud service providing devices 40, and the communication I/F units 330 communicate with the cloud service providing devices 40 in accordance with the protocols used by the cloud service providing devices 40. The first abstraction I/F unit 310 is an example of a first conversion unit according to an exemplary embodiment of the present invention that performs a first conversion process for mutual conversion between a language interpretable by each of plural client devices and a language interpretable by a relay device. The second abstraction I/F unit 320 is an example of a second conversion unit according to an exemplary embodiment of the present invention that performs a second conversion process for mutual conversion between a language interpretable by each of plural service providing devices and a language interpretable by a relay device. The communication I/F units 330a, 330b, and 330c are examples of plural communication interface units according to an exemplary embodiment of the present invention that are provided respectively for plural service providing devices and that are configured to communicate with the associated service providing devices in accordance with protocols (for example, HTTP) used by the service providing devices.

Operation

Next, an operation according to an exemplary embodiment will be described with reference to FIGS. 5 to 9. In the following description, by way of example, the client device 10a illustrated in FIG. 1 receives a data storage service provided from the cloud service providing device 40a.

Figure 5:
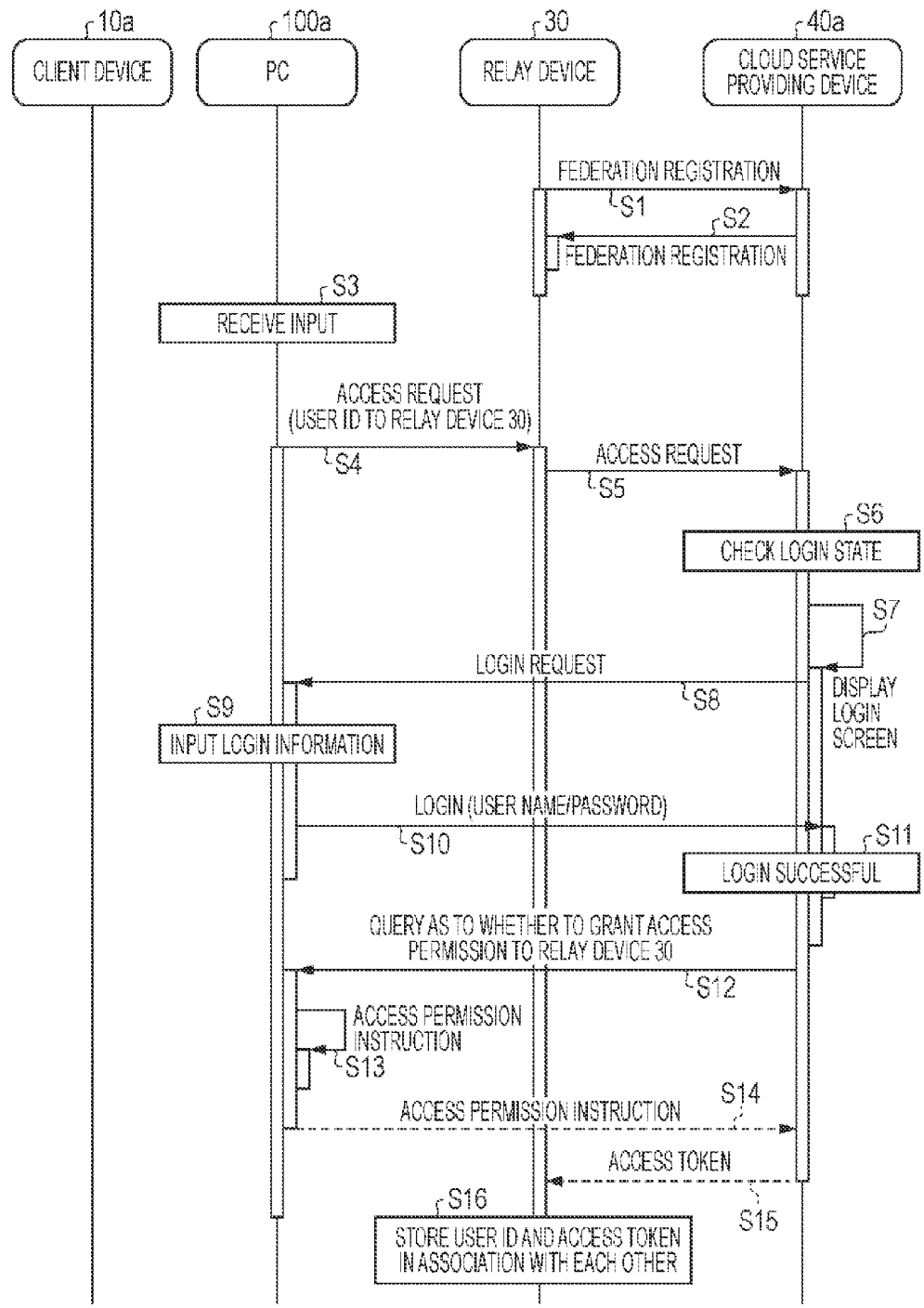
FIG. 5 is a sequence diagram illustrating the operation of the communication system.

In FIG. 5, the controller 31 of the relay device 30 needs to register itself in federation with one of the cloud service providing devices 40 that provides a service to the client device 10a. The term "federation", as used herein, means that the relay device 30 and the cloud service providing devices 40 federate with each other. In other words, the term "federation" means the state that credential is established between the relay device 30 and the cloud service providing devices 40. The controller 31 of the relay device 30 requests the cloud service providing device 40a to register itself in federation with the relay device 30 (step S1). The controller 31 of the relay device 30 sends device identification information for identifying the relay device 30 and a federation registration request to the cloud service providing device 40a. The cloud service providing device 40a transmits federation acceptance information indicating that federation has been accepted to the requesting relay device 30 (step S2). In this case, the cloud service providing device 40a stores the device identification information identifying the relay device 30 in association with information indicating acceptance of federation.

Then, the user operates the PC 100a to send a request for access to the cloud service to the relay device 30. In response to the access request, the controller 31 of the relay device 30 transmits data (for example, Uniform Resource Locator (URL) of the site for access to the cloud service) for displaying an access screen used for guiding access to the cloud service to the PC 100a, and the PC 100a causes the access screen to be displayed on the display 14 by using a function of a web browser or the like. The access screen is written in a hypertext markup language (HTML) or any other suitable language. The user enters their user ID and an input to access the desired cloud service providing device 40a (step S3). Here, as an example, the user "tanaka" enters the user ID "tanaka" to perform user authentication at the relay device 30.

The controller 31 of the relay device 30 may transmit to the PC 100a information indicating that access to the cloud service providing device 40a with which the relay device 30 has registered itself in federation in advance is possible, and may cause a screen that provides direct access to the cloud service providing device 40a to be displayed by using the function of the web browser of the PC 100a to allow the user to issue an instruction to access the cloud service providing device 40a on the screen.

The relay device 30 may register itself in advance in federation with the plural cloud service providing devices 40a, 40b, and 40c. In this case, the controller 31 of the relay device 30 may cause a screen for allowing the user to select which of the plural cloud service providing devices 40a, 40b, and 40c to access to be displayed on the PC 100a. When the user selects the cloud service providing device 40a they wish to access, the PC 100a transmits to the relay device 30 the user ID and a request for access to the cloud service providing device 40a (step S4). Upon receiving from the PC 100a the user ID and the request for access to the cloud service providing device 40a, the controller 31 of the relay device 30 transfers the access request received from the PC 100a to the cloud service providing device 40a registered in advance in federation with the relay device 30 (step S5). In this case, the controller 31 of the relay device 30 stores the user ID transmitted together with the access request from the PC 100a in the memory 33 in association with information indicating that the access request has been transferred to the cloud service providing device 40a.

Upon receiving the access request, the cloud service providing device 40a checks the login state (step S6). If a login account corresponding to the access request does not exist, the cloud service providing device 40a generates data for displaying a login request screen (step S7), and transmits the generated data to the PC 100a that has sent the access request.

The PC 100a displays a login screen for login to the cloud service providing device 40a by using the function of the web browser (step S8).

The user enters the login account, or the user name and the password, as authentication information used by the cloud service providing device 40a on the login screen for login to the cloud service providing device 40a which is displayed on the PC 100a (step S9). The login account entered by the user, or the user name and the password, is transmitted to the cloud service providing device 40a (step S10). Here, the user "tanaka" enters the user name "tanaka-cloud" and the password "aaaa", which are authentication information for login to the cloud service providing device 40a.

The cloud service providing device 40a performs authentication processing using a user database illustrated in FIG. 6 based on the received login account, namely, the user name and the password. If it is determined that login is successful (step S11), the cloud service providing device 40a generates screen data for prompting the user to input whether or not access is to be granted to permit the relay device 30 that has registered itself in advance in federation with the cloud service providing device 40a and that has transferred the access request to access the cloud service providing device 40a, and transmits the generated screen data to the PC 100a (step S12).

The PC 100a displays an access permission input screen based on the received screen data for inputting access permission by using the function of the web browser. When the user inputs "access permission" (step S13), the PC 100a transmits an "access permission" instruction to the cloud service providing device 40a (step S14).

Upon receiving an "access permission" instruction from the PC 100a, the cloud service providing device 40a issues an access token for accessing the cloud service providing device 40a to the relay device 30 that has transferred the access request and that has registered itself in advance in federation with the cloud service providing device 40a, and transmits the access token to the relay device 30 (step S15). The access token is privilege information granted to the login account by the cloud service providing device 40a, and includes, for example, account information and information indicating access privilege. When an access request is made together with the access token, the cloud service providing device 40a grants access with the privilege of the login account corresponding to the issued access token. Here, if the user name "tanaka-cloud" and the password "aaaa" entered by the user "tanaka", which are authentication information for login to the cloud service providing device 40a, are authenticated, the access token "1234abcd" corresponding to the account is issued and transmitted to the relay device 30 registered in federation with the cloud service providing device 40a.

The controller 31 of the relay device 30 stores the access token in the memory 33 in association with the user ID stored in step S5 in a manner illustrated in FIG. 7 (step S16). Here, the user ID "tanaka", which is information with which the user "tanaka" accesses the relay device 30, and the access token "1234abcd" issued in response to successful authentication of login to the cloud service providing device 40a by the user "tanaka" and transmitted to the relay device 30 are stored in association with each other, and are stored in the manner illustrated in FIG. 7. Through the process illustrated in FIG. 5 described above, the relay device 30 has access privilege to the cloud service providing device 40a specified by the user ID.

Next, referring to FIG. 8, the user inputs their user ID to the client device 10a by, for example, causing the client device 10a to read a card medium storing the user ID, and further operates the operation unit 13 to make a request for a list of cloud services. The controller 11 of the client device 10a accepts the operation, and transmits a service list request to the relay device 30 (step S21). In response to the request, the controller 31 of the relay device 30 transmits a service list to the client device 10a (step S22). When the user performs an operation of specifying a data storage service from the service list displayed on the display 14 of the client device 10a, the controller 11 of the client device 10a accepts the operation (step S23), and transmits a request for access to the data storage service to the relay device 30 (step S24).

Upon receiving the access request, the controller 31 of the relay device 30 performs conversion processing (step S25). Specifically, the first abstraction I/F unit 310 performs a process for converting a language interpretable by the client device 10a into an intermediate language interpretable by the controller 31 of the relay device 30, and the second abstraction I/F unit 320 performs a process for converting the intermediate language interpretable by the controller 31 of the relay device 30 into a language interpretable by the cloud service providing device 40a. The access request subjected to the conversion processes described above is transmitted to the cloud service providing device 40a from the communication I/F unit 330a associated with the cloud service providing device 40a after an access token corresponding to the user ID is added to the access request (step S26). After verifying the validity of the access token, the cloud service providing device 40a transmits information on a folder list in response to the access request to the relay device 30 (step S27). Specifically, since the cloud service providing device 40a has issued an access token concurrently with the successful login of the user, the cloud service providing device 40a permits the data storage service to be provided to the user whose access token has been validated, and transmits information on a list of folders available to the user to the relay device 30.

Upon receiving the information on the folder list, the controller 31 of the relay device 30 performs conversion processing (step S28). Specifically, the second abstraction I/F unit 320 performs a process for converting the language interpretable by the cloud service providing device 40a into the intermediate language interpretable by the controller 31 of the relay device 30, and the first abstraction I/F unit 310 performs a process for converting the intermediate language interpretable by the controller 31 of the relay device 30 into the language interpretable by the client device 10a. The information on the folder list subjected to the conversion processes described above is transmitted to the client device 10a (step S29).

The user refers to the folder list displayed on the display 14 of the client device 10a, and operates the operation unit 13 to specify a desired folder as a storage location. Then, the user performs an operation of causing the image forming/reading unit 15 of the client device 10a to read a document. Upon accepting this operation, the controller 11 of the client device 10a causes the image forming/reading unit 15 to read a document to acquire image data (step S30). The controller 11 of the client device 10a transmits the acquired image data and a request for storing the image data in the specified folder to the relay device 30 (step S31). Upon receiving the request and the image data, the controller 31 of the relay device 30 performs conversion processing from one language to another (step S32). Specifically, the first abstraction I/F unit 310 performs a process for converting the language interpretable by the client device 10a into the intermediate language interpretable by the controller 31 of the relay device 30, and the second abstraction I/F unit 320 performs a process for converting the intermediate language interpretable by the controller 31 of the relay device 30 into the language interpretable by the cloud service providing device 40a.

Then, the data subjected to the conversion processes described above (the image data and the request for storing the image data in the folder specified as a storage location) is transmitted to the cloud service providing device 40a from the communication I/F unit 330a associated with the cloud service providing device 40a after an access token corresponding to the user ID described above is added to the data (step S33). Upon receiving the request for storing the image data in the folder and the image data which have been converted by the relay device 30, the cloud service providing device 40a verifies the validity of the access token and then stores the image data in the folder (step S34). Then, the cloud service providing device 40a transmits a completion notification indicating that the image data has been stored (step S35). The controller 31 of the relay device 30 performs conversion processing similar to that in step S28 on the completion notification (step S36), and then transmits the resulting completion notification to the client device 10a (step S37). The controller 11 of the client device 10a displays the completion notification on the display 14.

In the foregoing description, by way of example, the client device 10a illustrated in FIG. 1 receives a data storage service provided by the cloud service providing device 40a. The following description will be made of an example in which the client device 10a prints document data held, generated, and managed by the cloud service providing device 40a.

A data printing service relayed by the relay device 30 enables document data managed by the cloud service providing device 40a to be specified by the client device 10a and relayed by the relay device 30 so that the document data may be printed and output from the client device 10a. Since the cloud service providing device 40a does not have a function for generating print data from document data, the relay device 30 acquires document data from the cloud service providing device 40a, converts the acquired document data into print data having a format that is printable by the client device 10a, and provides the print data to the client device 10a. Thus, the document data managed by the cloud service providing device 40a may be printed and output from the client device 10a.

The user performs the processing illustrated in FIG. 5 in advance to allow the relay device 30 to have access privilege to the cloud service providing device 40a specified by the user ID.

Next, referring to FIG. 9, the user inputs their user ID to the client device 10a by, for example, causing the client device 10a to read a card medium storing the user ID, and further operates the operation unit 13 to make a request for a list of cloud services. The controller 11 of the client device 10a accepts the operation, and transmits a service list request to the relay device 30 (step S41). In response to the request, the controller 31 of the relay device 30 transmits a service list to the client device 10a (step S42). When the user performs an operation of specifying a data printing service from the service list displayed on the display 14 of the client device 10a, the controller 11 of the client device 10a accepts the operation (step S43), and transmits a request for access to the data printing service to the relay device 30 (step S44).

Upon receiving the access request, the controller 31 of the relay device 30 performs conversion processing from one language to another (step S45). Specifically, the first abstraction I/F unit 310 performs a process for converting a language interpretable by the client device 10a into an intermediate language interpretable by the controller 31 of the relay device 30. The information (command) on the printing request supplied from the client device 10a is also converted into information (command) which requests that the cloud service providing device 40a acquire document data. Further, the second abstraction I/F unit 320 performs a process for converting the intermediate language interpretable by the controller 31 of the relay device 30 into a language interpretable by the cloud service providing device 40a. The access request including the document acquisition request, which has been subjected to the conversion processes described above, is transmitted to the cloud service providing device 40a from the communication I/F unit 330a associated with the cloud service providing device 40a after an access token corresponding to the user ID is added to the access request (step S46). After verifying the validity of the access token, the cloud service providing device 40a transmits information on a document data list corresponding to the user ID and available to the user to the relay device 30 in response to the access request (step S47). The document data may be document data held in the cloud service providing device 40a or may be document data generated based on data obtained as a result of processing performed by the cloud service providing device 40a. The document data may also be reference information to document data held by another cloud service providing device 40 or a document management device (not illustrated).

Upon receiving the information on the document data list, the controller 31 of the relay device 30 performs conversion processing (step S48). Specifically, the second abstraction I/F unit 320 performs a process for converting the language interpretable by the cloud service providing device 40a into the intermediate language interpretable by the controller 31 of the relay device 30, and the first abstraction I/F unit 310 performs a process for converting the intermediate language interpretable by the controller 31 of the relay device 30 into the language interpretable by the client device 10a. The information on the document data list subjected to the conversion processes described above is transmitted to the client device 10a (step S49).

The user refers to the document data list displayed on the display 14 of the client device 10a, and operates the operation unit 13 to specify desired document data to be printed using the client device 10a. Upon accepting this operation (step S50), the controller 11 of the client device 10a transmits information on a request for printing the specified document data to the relay device 30 (step S51). Upon receiving the printing request information, the controller 31 of the relay device 30 performs conversion processing from one language to another (step S52). Specifically, the first abstraction I/F unit 310 performs a process for converting the language interpretable by the client device 10a into the intermediate language interpretable by the controller 31 of the relay device 30. The information on the request for printing the specified document data is also converted into a request for acquiring the specified document data. Further, the second abstraction I/F unit 320 performs a process for converting the intermediate language interpretable by the controller 31 of the relay device 30 into the language interpretable by the cloud service providing device 40a.

Then, the data subjected to the conversion processes described above (the information on the request for acquiring the specified document data) is transmitted to the cloud service providing device 40a from the communication I/F unit 330a associated with the cloud service providing device 40a after an access token corresponding to the user ID described above is added to the data (step S53). Upon receiving the information on the request for acquiring the document data which has been converted by the relay device 30, the cloud service providing device 40a verifies the validity of the access token and then starts to perform acquisition request processing for the document data specified by the user (step S54). Then, the cloud service providing device 40a transmits the specified document data to the relay device 30 (step S55). The controller 31 of the relay device 30 performs print data generation processing on the document data transmitted from the cloud service providing device 40a to convert the document data into print data having a format printable by the client device 10a. Further, the controller 31 performs processing for converting the intermediate language interpretable by the controller 31 of the relay device 30 into the language interpretable by the client device 10a in a manner similar to that in step S48 (step S56). Then, the controller 31 transmits the generated print data and the information represented in the language interpretable by the client device 10a to the client device 10a (step S57). The controller 11 of the client device 10a prints and outputs the received print data from the image forming/reading unit 15 (step S58).

In the example of the data printing service described above, any document data is specified from a document data group held, generated, and managed by one of the cloud service providing device 40, e.g., the cloud service providing device 40a, and is printed. Alternatively, desired document data may be retrieved from a document data group held, generated, and managed by plural cloud service providing devices 40, and plural pieces of document data may be acquired from plural different cloud service providing devices 40 and printed. A specific example will be described hereinafter.

The relay device 30 registers itself in advance in federation with the plural cloud service providing devices 40a, 40b, and 40c, and the user accesses the plural cloud service providing devices 40a, 40b, and 40c to log in from the PC 100a via the relay device 30. Accordingly, the relay device 30 stores the user ID and access tokens issued by the cloud service providing devices 40a, 40b, and 40c in the memory 33 in association with each other.

The user inputs their user ID from the client device 10a, and makes a request for a data printing service. When a request for searching for document data to be printed and the search key (such as the document name or information added to the document) are transmitted from the client device 10a to the relay device 30, the controller 31 of the relay device 30 converts the language with which the request for searching the document data to be printed, which has been received from the client device 10a, is represented into a language with which the request for searching for the document data is represented, which is interpretable by each of the cloud service providing devices 40a, 40b, and 40c, and requests each of the cloud service providing devices 40a, 40b, and 40c to search for the document data.

The controller 31 of the relay device 30 receives information on the found document data from the respective cloud service providing devices 40 in the corresponding languages, and converts the languages into an intermediate language interpretable by the relay device 30. Then, the controller 31 generates information on a document data list that matches the search condition from the document data held and managed by each of the cloud service providing devices 40a, 40b, and 40c, converts the generated information into information represented in the language interpretable by the client device 10a, and transmits the resulting information to the client device 10a. In this case, the controller 31 stores information indicating which cloud service providing device 40 the acquired document data has been held and managed by.

In the client device 10a, document data to be printed is specified by using the operation unit 13 from the received information on the document data list, and a printing instruction is made. In response to the printing instruction, the client device 10a transmits information identifying the specified document data and the printing instruction information to the relay device 30. The controller 31 of the relay device 30 converts the language with which the received information is represented, and specifies document data instructed to be printed by the client device 10a. The controller 31 refers to the information indicating which cloud service providing device 40 the specified document data is held and managed by, and requests the cloud service providing devices 40 that hold and manage the specified document data to acquire document data.

In response to this acquisition request, each of the cloud service providing devices 40 transmits document data to the relay device 30. The controller 31 of the relay device 30 converts the document data acquired from each of the cloud service providing devices 40 into print data, and transmits the print data to the client device 10a. The client device 10a prints and outputs the print data. Accordingly, a printing request is made by the client device 10a after the search condition for the document data to be printed is input, thus allowing document data to be searched for across the plural cloud service providing devices 40 and to be printed. In addition to the search across the plural cloud service providing devices 40, pieces of document data held in the plural cloud service providing devices 40 may be collectively printed by batch.

Cloud services are not limited to those in the example according to the exemplary embodiment, and may include, for example, a service for performing image recognition, a service for converting the format of image data, and a service for managing the flow of information processing. The program executed by the client device 10, the relay device 30, and the cloud service providing device 40 may be provided by being recorded on a recording medium such as a magnetic tape, a magnetic disk, a floppy disk, an optical recording medium, a magneto-optical recording medium, a compact disk (CD), a digital versatile disk (DVD), or a RAM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay device comprising:
 a communication unit that communicates with an image forming device and a plurality of service providing devices configured to provide a service to the image forming device;
 a first conversion unit configured to perform a first conversion process between a request to store document data and a request to print the stored document data interpretable by the image forming device and an intermediate language interpretable by the relay device;
 a second conversion unit configured to perform a second conversion process between the request to store the document data and the request to print the stored document data interpretable by each of a plurality of service providing devices and the intermediate language interpretable by the relay device; and
 a controller configured to perform control so that when the communication unit receives the request to store the document data at a service providing device among the plurality of service providing devices from the image forming device, the first conversion unit performs the first conversion process to convert the request to store the document data into the intermediate language interpretable by the relay device, the second conversion unit performs the second conversion process to convert the request to store the document data into a language interpretable by the service providing device, and the communication unit transmits the converted request to store the document data to the service providing device, and
 when the communication unit receives the stored document data sent to the image forming device from the service providing device in response to receiving the request to print the stored document data from the image forming device, the second conversion unit is further configured to perform the second conversion process to convert the stored document data into the intermediate language interpretable by the relay device, the controller is further configured to convert the converted stored document data into print data, the first conversion unit is further configured to perform the first conversion process on the print data to convert the print data into a language interpretable by the image forming device, and the communication unit is further configured to transmit the converted print data to the image forming device,
 wherein the language interpretable by the image forming device, the language interpretable by the service providing device, and the intermediate language interpretable by the relay device are different from each other.

2. The relay device according to claim 1, wherein the communication unit includes a plurality of communication interface units that are provided so as to respectively correspond to the plurality of service providing devices, each of the plurality of communication interface units configured to communicate with the corresponding one of the plurality of service providing devices in accordance with a protocol used by the service providing device.

3. A non-transitory computer readable medium storing a program causing a computer to execute a process, the process comprising:
 establishing communication between a relay device and an image forming device and communication between the relay device and a service providing device among a plurality of service providing devices that provides a service to the image forming device;
 performing a first conversion process between a request to store document data and a request to print the stored document data interpretable by the image forming device and an intermediate language interpretable by the relay device;
 performing a second conversion process between the request to store the document data and the request to print the stored document data interpretable by each of a plurality of service providing devices and the intermediate language interpretable by the relay device; and
 performing control so as to when receiving the request to store the document data at the service providing device from the image forming device, perform the first conversion process to convert the request to store the document data into the intermediate language interpretable by the relay device and the second conversion process to convert the request to store the document data into a language interpretable by the service providing device and transmit the converted request to store the document data to the service providing device, and when receiving the stored document data sent to the image forming device from the service providing device in response to receiving the request to print the document stored data from the image forming device, perform the second conversion process to convert the stored document data into the intermediate language interpretable by the relay device, convert the stored document data into print data, and the first conversion process on the print data to convert the print data into a language interpretable by the image forming device, and transmit the converted print data to the image forming device, wherein the language interpretable by the image forming device, the language interpretable by the service providing device, and the intermediate language interpretable by the relay device are different from each other.

4. A relay method comprising:

establishing communication between a relay device and an image forming device and communication between the relay device and a service providing device among a plurality of service providing devices that provides a service to the image forming device;

performing a first conversion process between a request to store document data and a request to print the stored document data interpretable by the image forming device and an intermediate language interpretable by the relay device;

performing a second conversion process between the request to store the document data and the request to print the stored document data interpretable by each of a plurality of service providing devices and the intermediate language interpretable by the relay device; and performing control so as to when receiving the request to store the document data at the service providing device from the image forming device, perform the first conversion process to convert the request to store the document data into the intermediate language interpretable by the relay device and the second conversion process to convert the request to store the document data into a language interpretable by the service providing device and transmit the converted request to store the document data to the service providing device, and when receiving the stored document data sent to the image forming device from the service providing device in response to receiving the request to print the stored document data from the image forming device, perform the second conversion process to convert the stored document data into the intermediate language interpretable by the relay device, convert the stored document data into print data, and the first conversion process on the print data to convert the print data into a language interpretable by the image forming device, and transmit the converted print data to the image forming device, wherein the language interpretable by the image forming device, the language interpretable by the service providing device, and the intermediate language interpretable by the relay device are different from each other.

* * * * *